United States Patent [19]

Gennaro

[11] Patent Number: 5,746,393
[45] Date of Patent: May 5, 1998

[54] AIRCRAFT WHEEL ROTATING APPARATUS

[76] Inventor: Rosemarie A. Gennaro, 6545 Southwest 20th Ct., Plantation, Fla. 33317

[21] Appl. No.: 670,266

[22] Filed: Jun. 21, 1996

[51] Int. Cl.[6] .................................................. B64C 25/40
[52] U.S. Cl. ........................................ 244/103 S; 244/111
[58] Field of Search ................................ 244/103 S, 111

[56] References Cited

U.S. PATENT DOCUMENTS

| | | | |
|---|---|---|---|
| 2,414,849 | 1/1947 | Beazley | 244/103 S |
| 2,466,568 | 4/1949 | Bean | 244/103 S |
| 2,665,087 | 1/1954 | Clover | 244/111 X |
| 5,104,063 | 4/1992 | Hartley | 244/103 S |

FOREIGN PATENT DOCUMENTS

| 2109563 | 6/1978 | Germany | 244/103 S |
|---|---|---|---|

*Primary Examiner*—William Grant

[57] ABSTRACT

An aircraft wheel rotating apparatus comprised of an inner circular portion dimensioned for coupling with a wheel of an aircraft. An outer circular portion is integral with an outer end of the inner circular portion. The outer circular portion is dimensioned to receive a braking system of an aircraft therein and an axle of the aircraft therethrough to extend through the inner circular portion to couple with the aircraft wheel. A plurality of crescent shaped turbine blades are secured to the outer circular portion.

2 Claims, 2 Drawing Sheets

AIRCRAFT WHEEL ROTATING APPARATUS

BACKGROUND OF THE INVENTION

1. Field of the Invention

The present invention relates to an aircraft wheel rotating apparatus and more particularly pertains to accelerating airplane landing gear during final approach to a runway with an aircraft wheel rotating apparatus.

2. Description of the Prior Art

The use of aircraft wheel rotation devices is known in the prior art. More specifically, aircraft wheel rotation devices heretofore devised and utilized for the purpose of rotating a wheel of an aircraft are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,213,285 to Stanko discloses a rotating aircraft tire/landing gear apparatus.

U.S. Pat. No. 5,104,063 to Hartley discloses an aircraft landing gear prerotation system.

U.S. Pat. No. Des. 303,106 to Macaluso discloses the ornamental design for an aircraft landing wheel rotator attachment.

U.S. Pat. No. 5,259,431 to Housiaux discloses an aircraft tire with sidewall vanes.

U.S. Pat. No. 4,732,350 to Lamont discloses an aircraft wheel rotation apparatus.

U.S. Pat. No. 4,491,288 to Sinclair discloses an aircraft landing wheel rotating means.

While these devices fulfill their respective, particular objective and requirements, the aforementioned patents do not describe an aircraft wheel rotating apparatus for accelerating airplane landing gear during final approach to a runway.

In this respect, the aircraft wheel rotating apparatus according to the present invention substantially departs from the conventional concepts and designs of the prior art, and in doing so provides an apparatus primarily developed for the purpose of accelerating airplane landing gear during final approach to a runway.

Therefore, it can be appreciated that there exists a continuing need for new and improved aircraft wheel rotating apparatus which can be used for accelerating airplane landing gear during final approach to a runway. In this regard, the present invention substantially fulfills this need.

SUMMARY OF THE INVENTION

In the view of the foregoing disadvantages inherent in the known types of aircraft wheel rotation devices now present in the prior art, the present invention provides an improved aircraft wheel rotating apparatus. As such, the general purpose of the present invention, which will be described subsequently in greater detail, is to provide a new and improved aircraft wheel rotating apparatus and method which has all the advantages of the prior art and none of the disadvantages.

To attain this, the present invention essentially comprises an inner circular portion having an inner end and an outer end. The inner end is dimensioned for coupling with a wheel of an aircraft. The inner circular portion has a central aperture formed therethrough. The device includes an outer circular portion having an inner end and an outer end. The inner end is integral with the outer end of the inner circular portion. The outer circular portion has a plurality of apertures therethrough arranged in a circular configuration. The plurality of apertures form a periphery equal in dimension to the central aperture of the inner circular portion. The outer circular portion has a central aperture formed therethrough within the periphery of the plurality of apertures. The central aperture has a flange therearound. The outer end has an outer flange secured to an outer periphery thereof. The outer end is dimensioned to receive a braking system of an aircraft therein. The central aperture of the outer circular portion receives an axle of the aircraft therethrough to extend through the central aperture of the inner circular portion to couple with the aircraft wheel. A plurality of crescent shaped turbine blades are secured to an outer portion of the outer flange of the outer end of the outer circular portion. Each of the blades has a concave outer surface and a convex inner surface. The blades are equally spaced apart along the outer flange.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved aircraft wheel rotating apparatus which has all the advantages of the prior art aircraft wheel rotation devices and none of the disadvantages.

It is another object of the present invention to provide a new and improved aircraft wheel rotating apparatus which may be easily and efficiently manufactured and marketed.

It is a further object of the present invention to provide a new and improved aircraft wheel rotating apparatus which is of durable and reliable construction.

An even further object of the present invention is to provide a new and improved aircraft wheel rotating apparatus which is susceptible of a low cost of manufacture with regard to both materials and labor, and which accordingly is then susceptible of low prices of sale to the consuming public, thereby making such an aircraft wheel rotating apparatus economically available to the buying public.

Still yet another object of the present invention is to provide a new and improved aircraft wheel rotating apparatus which provides in the apparatuses and methods of the prior art some of the advantages thereof, while simultaneously overcoming some of the disadvantages normally associated therewith.

Even still another object of the present invention is to provide a new and improved aircraft wheel rotating apparatus for accelerating airplane landing gear during final approach to a runway.

Lastly, it is an object of the present invention to provide a new and improved aircraft wheel rotating apparatus comprised of an inner circular portion dimensioned for coupling with a wheel of an aircraft. An outer circular portion is integral with an outer end of the inner circular portion. The outer circular portion is dimensioned to receive a braking system of an aircraft therein and an axle of the aircraft therethrough to extend through the inner circular portion to couple with the aircraft wheel. A plurality of crescent shaped turbine blades are secured to the outer circular portion.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
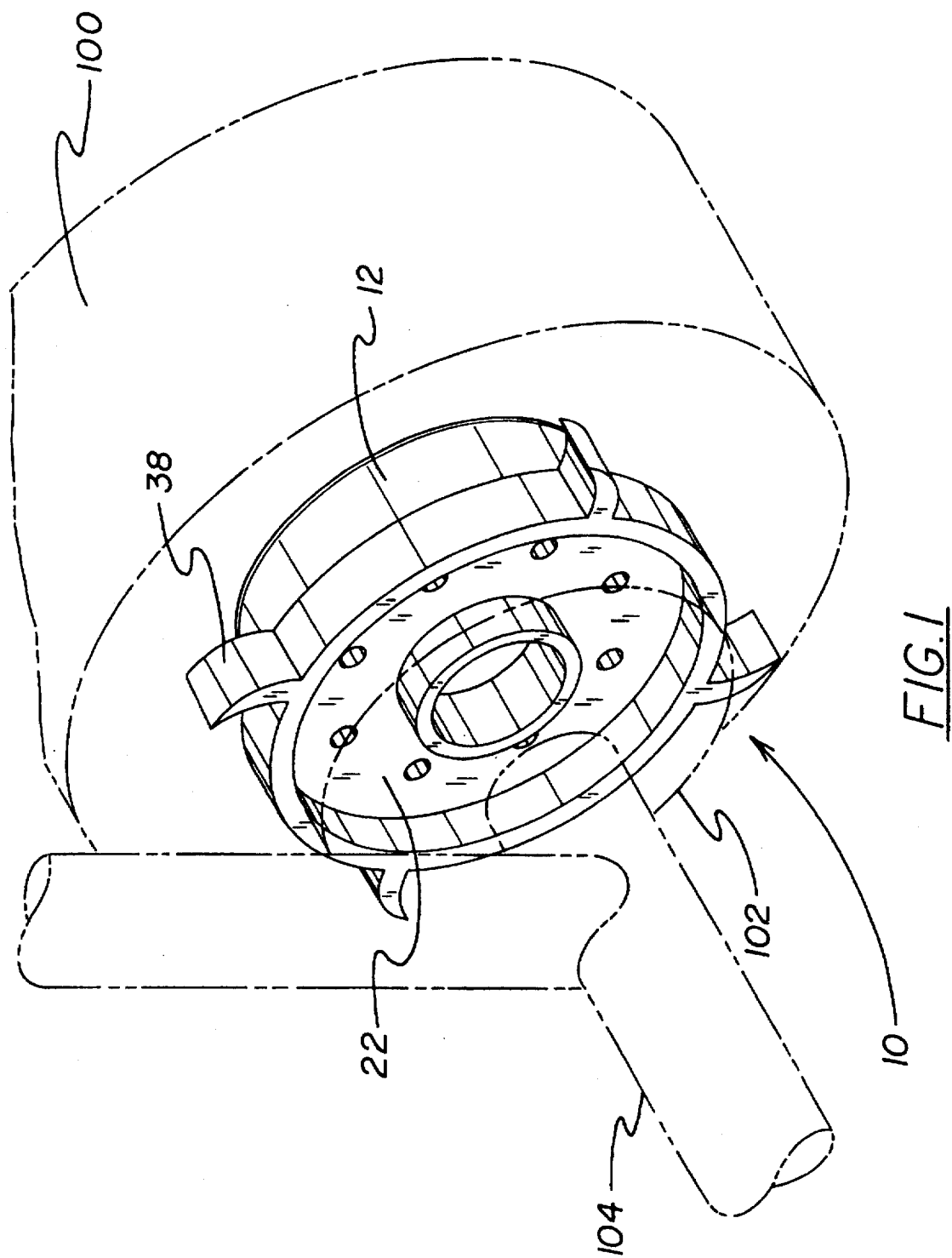
FIG. 1 is a perspective view of the preferred embodiment of the aircraft wheel rotating apparatus constructed in accordance with the principles of the present invention.
Figure 2:
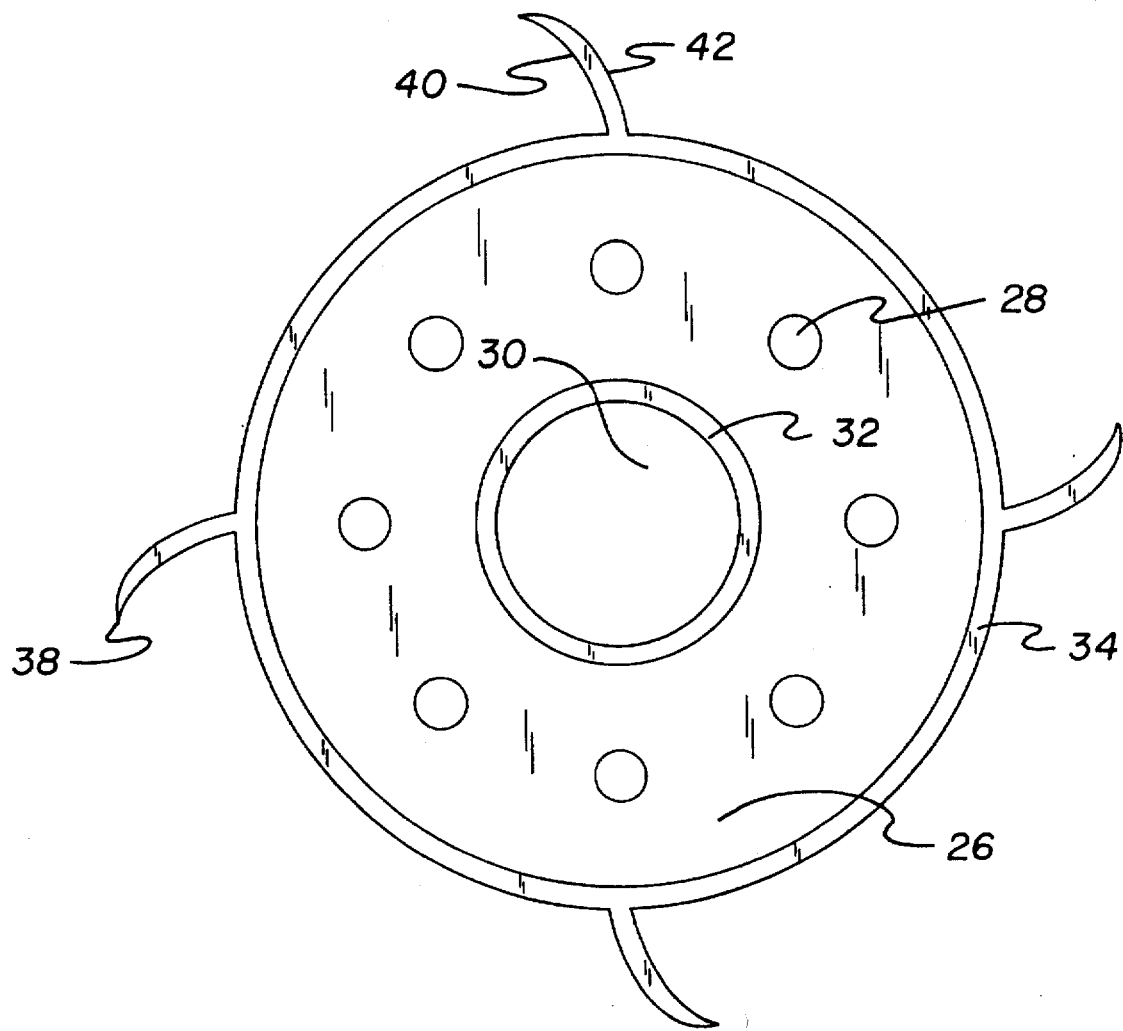
FIG. 2 is a plan view of the preferred embodiment of the present invention.
Figure 3:
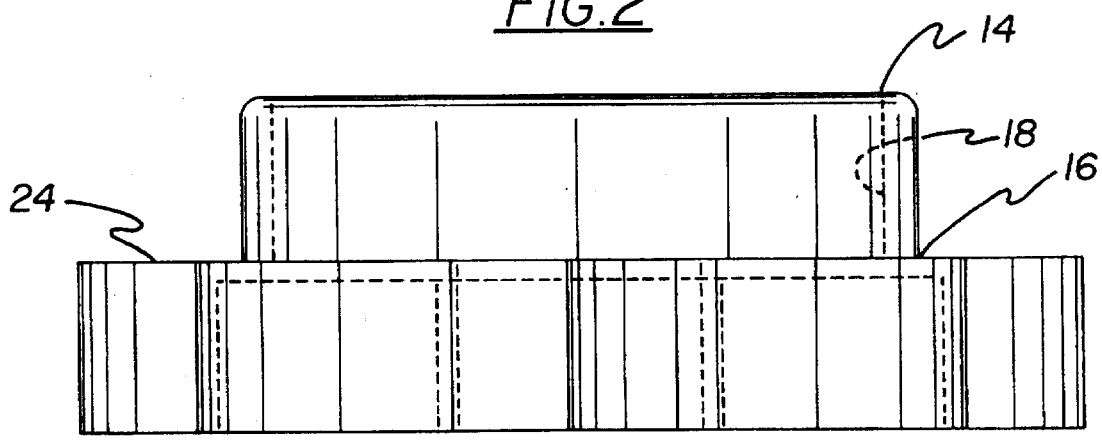
FIG. 3 is a side elevation view of the present invention.

With reference now to the drawings, and in particular, to FIGS. 1-3 thereof, the preferred embodiment of the new and improved aircraft wheel rotating apparatus embodying the principles and concepts of the present invention and generally designated by the reference number 10 will be described.

Specifically, it will be noted in the various Figures that the device relates to a new and improved aircraft wheel rotating apparatus for accelerating airplane landing gear during final approach to a runway. In its broadest context, the device consists of an inner circular portion, an outer circular portion, and a plurality of crescent shaped turbine blades. Such components are individually configured and correlated with respect to each other so as to attain the desired objective.

The device 10 includes an inner circular portion 12 having an inner end 14 and an outer end 16. The inner end 14 is dimensioned for coupling with a wheel 100 of an aircraft. The inner circular portion 12 has a central aperture 18 formed therethrough. The inner circular portion 12 is situated within the wheel 100 of the aircraft so as not to preclude the rotational movement thereof.

The device 10 includes an outer circular portion 22 having an inner end 24 and an outer end 26. The inner end 24 is integral with the outer end 16 of the inner circular portion 12. The outer circular portion 22 having a diameter greater than the diameter of the inner circular portion 12. The outer circular portion 22 has a plurality of apertures 28 therethrough arranged in a circular configuration. The plurality of apertures 28 form a periphery equal in dimension to the central aperture 18 of the inner circular portion 12. The outer circular portion 22 has a central aperture 30 formed therethrough within the periphery of the plurality of apertures 28. The periphery of the plurality of apertures 28 has a diameter about twice the diameter of the central aperture 30. The central aperture 30 has a flange 32 therearound. The outer end 26 has an outer flange 34 secured to an outer periphery thereof. The outer end 26 is dimensioned to receive a braking system 102 of an aircraft therein. The central aperture 30 of the outer circular portion 22 receives an axle 104 of the aircraft therethrough to extend through the central aperture 18 of the inner circular portion 12 to couple with the aircraft wheel 100.

A plurality of crescent shaped turbine blades 38 are secured to an outer portion of the outer flange 34 of the outer end 26 of the outer circular portion 22. Each of the blades 38 has a concave outer surface 40 and a convex inner surface 42. The blades 38 are equally spaced apart along the outer flange 34. In the preferred embodiment, the number of blades 38 is four. The turbine blades 38 are designed so that when the landing gear is extended during flight, the force of the air would cause the turbine blades 38 to rotate, which would direct rotational force to the tires. The rotating speed of the tires would match the aircraft's ground speed upon touchdown on the runway. The device 10 could be produced in various dimensions and profiles to suit aircraft of different sizes. The device 10 may also be offered for aftermarket attachment to existing wheel rims, or could be incorporated into newly manufactured wheels.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. An aircraft wheel rotating apparatus for accelerating airplane landing gear during final approach to a runway comprising, in combination:

an inner circular portion having an inner end and an outer end, the inner end being dimensioned for coupling with a wheel of an aircraft, the inner circular portion having a central aperture formed therethrough;

an outer circular portion having an inner end and an outer end, the inner end of the outer circular portion being integral with the outer end of the inner circular portion, the outer circular portion having a plurality of apertures therethrough arranged in a circular configuration, the plurality of apertures forming a periphery equal in dimension to the central aperture of the inner circular portion, the outer circular portion having a central aperture formed therethrough within the periphery of the plurality of apertures, the central aperture at the outer circular portion having a flange therearound, the outer end of the outer circular portion having an outer flange secured to an outer periphery thereof, the outer end of the outer circular portion being dimensioned to receive a braking system of an aircraft therein, the central aperture of the outer circular portion receiving an axle of the aircraft therethrough to extend through the central aperture of the inner circular portion to couple with the aircraft wheel;

a plurality of crescent shaped turbine blades secured to an outer portion of the outer flange of the outer end of the outer circular portion, each of the blades having a concave outer surface and a convex inner surface, wherein the blades are equally spaced apart along the outer flange.

2. An aircraft wheel rotating apparatus comprising:

an inner circular portion dimensioned for coupling with a wheel of an aircraft;

an outer circular portion integral with an outer end of the inner circular portion, the outer circular portion dimensioned to receive a braking system of an aircraft therein and an axle of the aircraft therethrough to extend through the inner circular portion to couple with the aircraft wheel;

a plurality of crescent shaped turbine blades secured to the outer circular portion;

wherein the inner circular portion has an inner end, the inner end being dimensioned for coupling with the wheel of the aircraft, the inner circular portion having a central aperture formed therethrough;

wherein the outer circular portion has an inner end and an outer end, the inner end of the outer circular portion being integral with the outer end of the inner circular portion, the outer circular portion having a plurality of apertures therethrough arranged in a circular configuration, the plurality of apertures forming a periphery equal in dimension to the central aperture of the inner circular portion, the outer circular portion having a central aperture formed therethrough within the periphery of the plurality of apertures, the central aperture of the outer circular portion having a flange therearound, the outer end of the outer circular portion having an outer flange secured to an outer periphery thereof, the outer end of the outer circular portion being dimensioned to receive the braking system of the aircraft therein, the central aperture of the outer circular portion receiving the axle of the aircraft therethrough to extend through the central aperture of the inner circular portion to couple with the aircraft wheel.

* * * * *